(12) United States Patent
Tobita

(10) Patent No.: US 8,559,842 B2
(45) Date of Patent: Oct. 15, 2013

(54) POWER SUPPLY APPARATUS, ELECTRICAL EQUIPMENT, AND IMAGE FORMING APPARATUS

(75) Inventor: Shinichi Tobita, Saitama (JP)

(73) Assignee: Ricoh Company, Limited, Tokyo (JP)

(*) Notice: Subject to any disclaimer, the term of this patent is extended or adjusted under 35 U.S.C. 154(b) by 351 days.

(21) Appl. No.: 12/978,806

(22) Filed: Dec. 27, 2010

(65) Prior Publication Data

US 2011/0176827 A1    Jul. 21, 2011

(30) Foreign Application Priority Data

Jan. 21, 2010    (JP) ................................. 2010-010651

(51) Int. Cl.
*G03G 15/00*    (2006.01)

(52) U.S. Cl.
USPC .......................................................... 399/88

(58) Field of Classification Search
USPC ....................... 399/88–90; 713/300
See application file for complete search history.

(56) References Cited

U.S. PATENT DOCUMENTS

2006/0182458 A1*    8/2006    Hall et al. .................... 399/88

FOREIGN PATENT DOCUMENTS

JP    2001-186760    7/2001

* cited by examiner

*Primary Examiner* — Hoang Ngo
(74) *Attorney, Agent, or Firm* — Oblon, Spivak, McClelland, Maier & Neustadt, L.L.P.

(57) ABSTRACT

A power supply apparatus includes a first electric power-generating unit that generates an electric power with a first voltage, a second electric power-generating unit that generates an electric power with a second voltage that is higher than the first voltage, and an overcurrent monitoring circuit to which electric powers for operation are supplied from the first electric power-generating unit and the second electric power-generating unit and that monitors overcurrent in the second electric power-generating unit.

14 Claims, 17 Drawing Sheets

POWER SUPPLY APPARATUS, ELECTRICAL EQUIPMENT, AND IMAGE FORMING APPARATUS

CROSS-REFERENCE TO RELATED APPLICATIONS

The present application claims priority to and incorporates by reference the entire contents of Japanese Patent Application No. 2010-010651 filed in Japan on Jan. 21, 2010.

BACKGROUND OF THE INVENTION

1. Field of the Invention

The present invention relates to a power supply apparatus, an electrical equipment, and an image forming apparatus. More specifically, the present invention relates to a power supply apparatus that supplies a plurality of electric powers with different voltages to the exterior, and an electrical equipment and an image forming apparatus that include the power supply apparatus.

2. Description of the Related Art

For example, an image forming apparatus, such as a printer, includes a processing unit that performs image processing and a driving unit that drives a photosensitive element and a polygon mirror in rotation.

The processing unit includes a central processing unit (CPU) and various electronic components that operate at 3 volts or 5 volts. On the other hand, the driving unit includes a motor that operates at a voltage (for example, 24 volts) higher than that for the electronic components. Therefore, an image forming apparatus includes a power supply apparatus that supplies a plurality of electric powers with different voltages.

When a short circuit occurs or when a large current flows in a circuit due to a load side failure or the like, abnormal heat may occur to increase failure, or in the worst case, smoking, ignition, or the like may occur.

For this reason, an overcurrent monitoring circuit is mounted on the power supply apparatus in order to stop the output when overcurrent flows.

For example, Japanese Patent Application Laid-open No. 2001-186760 discloses a power supply apparatus including: a detecting unit that detects the state of the apparatus and outputs the detection information; an abnormality judging unit that judges whether the detection information received from the detecting unit is abnormal based on a preset threshold and outputs an abnormal signal when judged as abnormality; and a breaking unit that breaks the input circuit of the apparatus based on the abnormal signal received from the abnormality judging unit. In the power supply apparatus, when the abnormality judging unit judges that the detection information is abnormal, the breaking unit immediately breaks the input circuit of the apparatus.

However, the power supply apparatus disclosed in Japanese Patent Application Laid-open No. 2001-186760 needs to mount a power supply for operating the abnormality judging unit, which inhibits downsizing and cost reduction.

SUMMARY OF THE INVENTION

It is an object of the present invention to at least partially solve the problems in the conventional technology.

According to an aspect of the present invention there is provided a power supply apparatus that supplies a plurality of electric powers with different voltages. The power supply apparatus includes: a first electric power-generating circuit that generates an electric power with a first voltage; a second electric power-generating circuit that generates an electric power with a second voltage that is higher than the first voltage; and an overcurrent monitoring circuit to which electric powers for operation are supplied from the first electric power-generating circuit and the second electric power-generating circuit and that monitors overcurrent in the second electric power-generating circuit.

According to another aspect of the present invention there is provided an electrical equipment including the power supply apparatus.

According to still another aspect of the present invention there is provided an image forming apparatus including the power supply apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
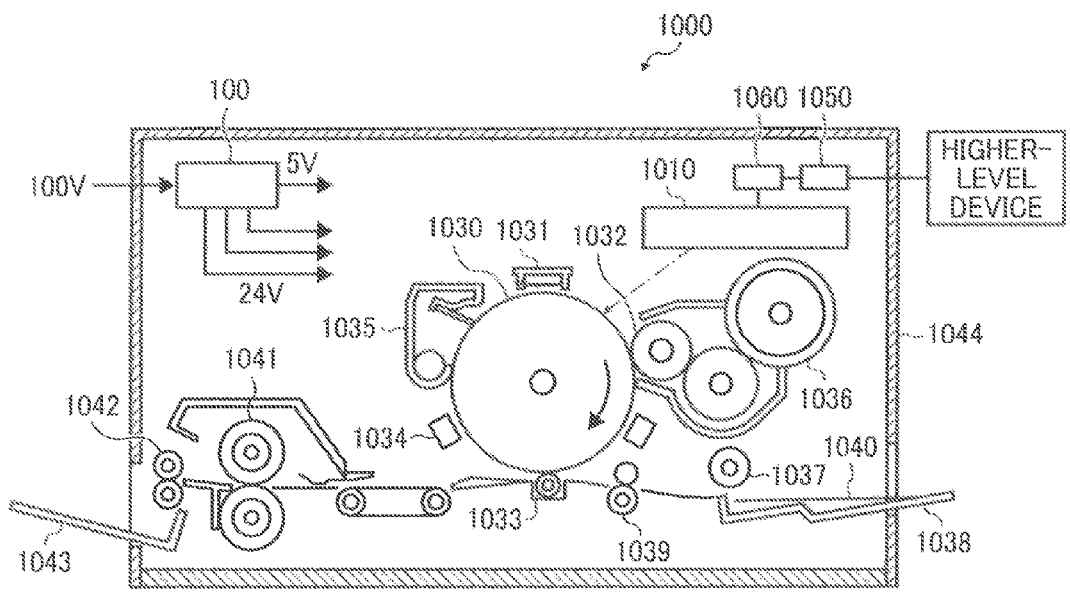
FIG. 1 is a schematic for explaining a structure of a laser printer according to an embodiment of the present invention.

An embodiment of the present invention is described below with reference to FIGS. 1 to 19. FIG. 1 illustrates a schematic structure of a laser printer 1000 according to the embodiment of the present invention.

The laser printer 1000 includes an optical scanning device 1010, a photosensitive element 1030, an electric charger 1031, a developing roller 1032, a transfer charger 1033, a neutralization unit 1034, a cleaning unit 1035, a toner cartridge 1036, a feeding roller 1037, a paper feed tray 1038, a pair of registration rollers 1039, a fixing roller 1041, a discharging roller 1042, a discharge tray 1043, a communication control device 1050, a power supply apparatus 100, and a printer control device 1060 that collectively controls each of the units described above. These are housed in a printer housing 1044 at predetermined positions.

The communication control device 1050 controls two-way communication between the laser printer 1000 and a higher-level device (a personal computer, for example) via a network or the like.

The photosensitive element 1030 is a cylindrical member and has a photosensitive layer formed on the surface thereof. In other words, the surface of the photosensitive element 1030 is a surface to be scanned. A driving motor (not illustrated) rotates the photosensitive element 1030 in an arrow direction illustrated in FIG. 1.

The electric charger 1031, the developing roller 1032, the transfer charger 1033, the neutralization unit 1034, and the cleaning unit 1035 are arranged near the surface of the photosensitive element 1030. The electric charger 1031, the developing roller 1032, the transfer charger 1033, the neutralization unit 1034, and the cleaning unit 1035 are arranged in this order along the rotation direction of the photosensitive element 1030.

The electric charger 1031 uniformly charges the surface of the photosensitive element 1030.

The optical scanning device 1010 scans the surface of the photosensitive element 1030 charged by the electric charger 1031 with a light beam modulated based on image information received from the upper-level device to form a latent image corresponding to the image information on the surface of the photosensitive element 1030. The latent image formed in this process moves in a direction towards the developing roller 1032 according to the rotation of the photosensitive element 1030. The structure of the optical scanning device 1010 is described later.

Toner is stored in the toner cartridge 1036 and is supplied to the developing roller 1032.

The developing roller 1032 makes the tonner supplied from the toner cartridge 1036 adhere to the latent image formed on the surface of the photosensitive element 1030 to visualize the image information. The latent image to which the toner is adhered (hereinafter, also referred to as a "toner image" for convenience) moves in a direction towards the transfer charger 1033 according to the rotation of the photosensitive element 1030.

The paper feed tray 1038 stores therein a recording sheet 1040. The feeding roller 1037 is arranged near the paper feed tray 1038, takes out the recording sheet 1040 from the paper feed tray 1038 one by one, and conveys the sheet to the pair of registration rollers 1039. The pair of registration rollers 1039 once holds the recording sheet 1040 taken out by the feeding roller 1037 and sends out the recording sheet 1040 into the gap between the photosensitive element 1030 and the transfer charger 1033 in time with the rotation of the photosensitive element 1030.

Voltage having reverse polarity with respect to the toner is applied to the transfer charger 1033 in order to electrically attract the toner on the surface of the photosensitive element 1030 to the recording sheet 1040. The toner image on the surface of the photosensitive element 1030 is transferred onto the recording sheet 1040 with this voltage. The recording sheet 1040 onto which the image is transferred is sent to the fixing roller 1041.

The fixing roller 1041 applies heat and pressure onto the recording sheet 1040, and thus, the toner is fixed on the recording sheet 1040. The recording sheet 1040 on which the toner is fixed in this process is sent to the discharge tray 1043 through the discharging roller 1042 and is sequentially stacked on the discharge tray 1043.

Here, a mechanism for conveying the recording sheet 1040 from the paper feed tray 1038 to the discharge tray 1043 is also referred to as a "conveying system". The conveying system includes a plurality of driving motors (not illustrated) for rotating each roller or other components.

The neutralization unit 1034 neutralizes the surface of the photosensitive element 1030.

The cleaning unit 1035 removes the toner (residual toner) remaining on the surface of the photosensitive element 1030. The surface of the photosensitive element 1030 from which the residual toner is removed returns to a position facing the electric charger 1031 again.

The structure of the optical scanning device 1010 is described below.

Figure 2:
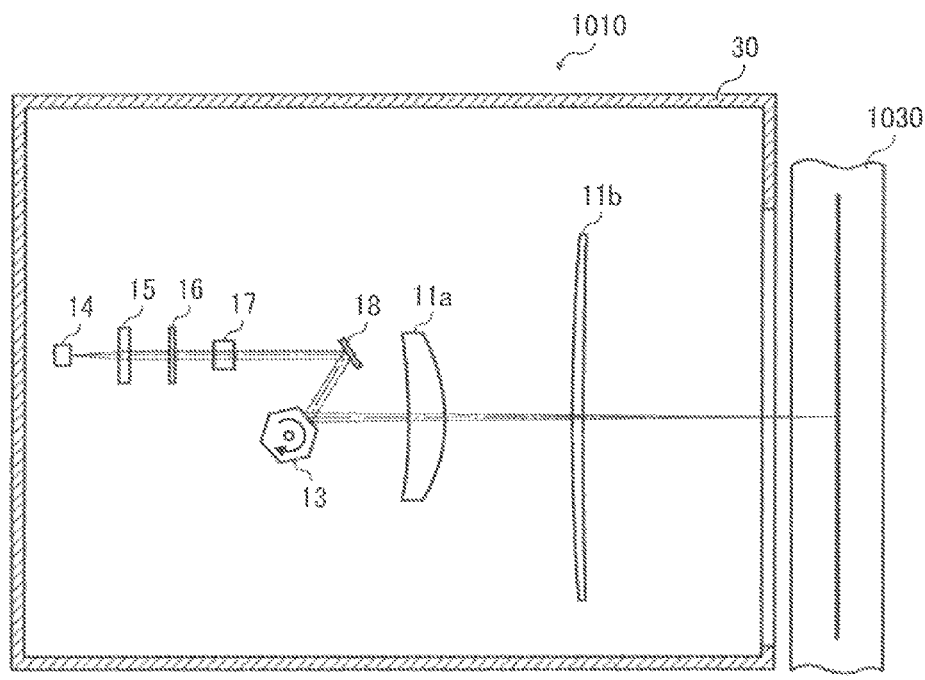
FIG. 2 is a schematic of an optical scanning device illustrated in FIG. 1.

As illustrated in FIG. 2 as one example, the optical scanning device 1010 includes a deflector side-scanning lens 11a, an image surface side-scanning lens 11b, a polygon mirror 13, a light source 14, a coupling lens 15, an opening plate 16, a cylindrical lens 17, a reflecting mirror 18, and a scanning control device (not illustrated). These are assembled in an optical housing 30 at predetermined positions.

The direction corresponding to the main-scanning direction is abbreviated as a "main-scanning corresponding direction", and the direction corresponding to the sub-scanning direction is abbreviated as a "sub-scanning corresponding direction", hereinafter for convenience.

The coupling lens 15 makes the light beam output from the light source 14 be a substantially parallel light.

The opening plate 16 has an opening portion and adjusts the beam diameter of the light beam passing through the coupling lens 15.

The cylindrical lens 17 focuses the light beam after passing through the opening portion of the opening plate 16 at a position near the deflection reflection surface of the polygon mirror 13 in the sub-scanning corresponding direction via the reflecting mirror 18.

The optical system arranged on the optical path at a position between the light source 14 and the polygon mirror 13 is also referred to as a pre-deflector optical system. In the present embodiment, the pre-deflector optical system includes the coupling lens 15, the opening plate 16, the cylindrical lens 17, and the reflecting mirror 18.

As an example, the polygon mirror 13 includes a six-sided mirror having an inscribed circle radius of 18 millimeters in which each mirror serves as a deflection reflection surface. The polygon mirror 13 deflects the light beam from the reflecting mirror 18 while being rotated by a driving motor (not illustrated) at a constant speed about an axis parallel to the sub-scanning corresponding direction.

The deflector side-scanning lens 11a is arranged on the optical path of the light beam deflected by the polygon mirror 13.

The image surface side-scanning lens 11b is arranged on the optical path of the light beam passing through the deflector side-scanning lens 11a. The surface of the photosensitive element 1030 is irradiated with the light beam passing through the image surface side-scanning lens 11b, and a light spot is formed thereon. The light spot moves in the longitudinal direction of the photosensitive element 1030 according to the rotation of the polygon mirror 13. In other words, the light spot scans the photosensitive element 1030. In this process, the movement direction of the light spot is the "main-scanning direction". The rotation direction of the photosensitive element 1030 is the "sub-scanning direction".

The optical system arranged on the optical path between the polygon mirror 13 and the photosensitive element 1030 is also referred to as a scanning optical system. In the present embodiment, the scanning optical system includes the deflector side-scanning lens 11a and the image surface side-scanning lens 11b. At least one reflecting mirror may also be arranged on at least one of the optical path between the deflector side-scanning lens 11a and the image surface side-scanning lens 11b and the optical path between the image surface side-scanning lens 11b and the photosensitive element 1030.

Figure 3:
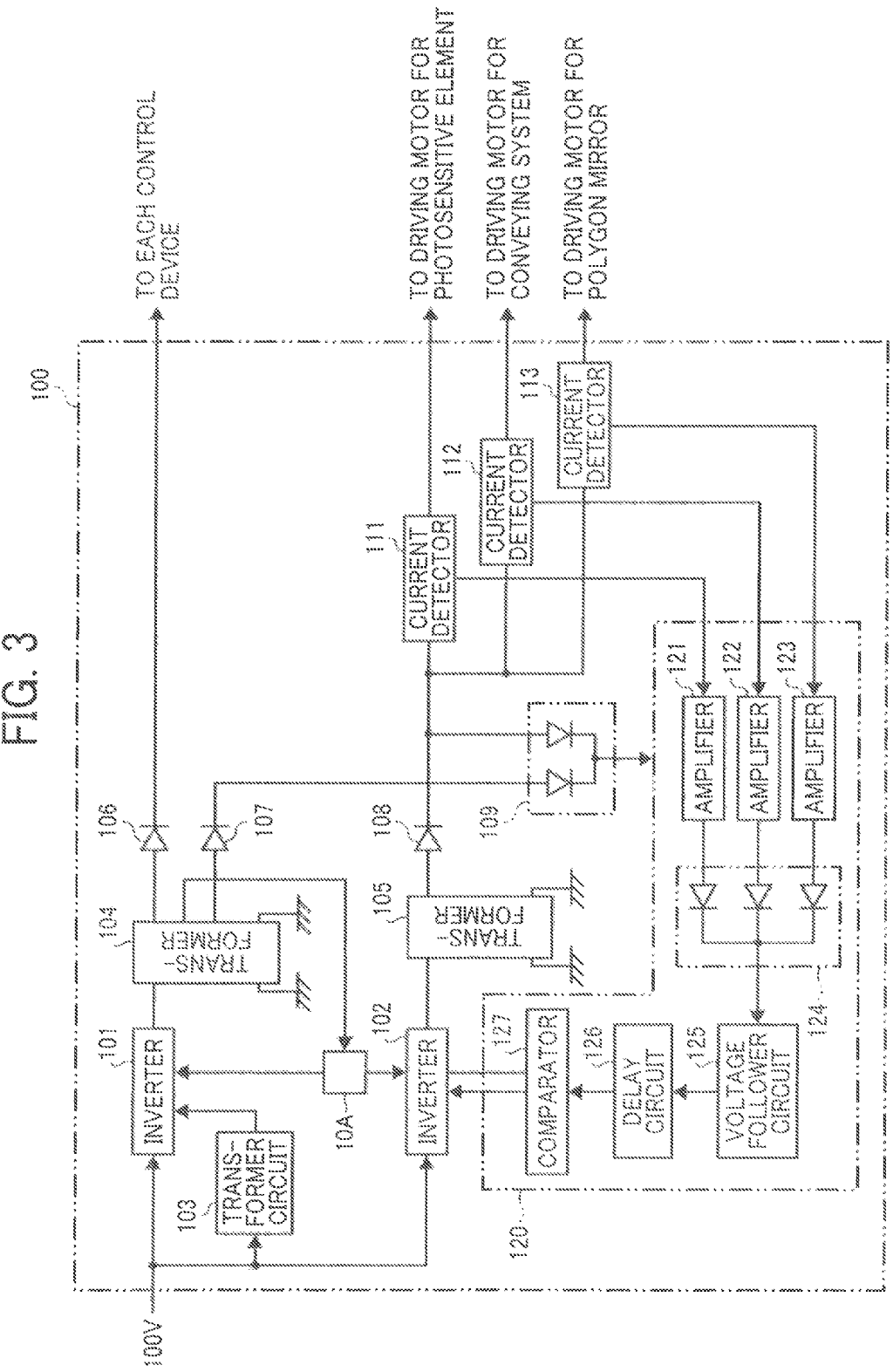
FIG. 3 is a schematic for explaining a structure of a power supply apparatus.

FIG. 3 illustrates a structure of the power supply apparatus 100. The power supply apparatus 100 includes, for example, two inverters (101 and 102), a transformer circuit 103, two transformers (104 and 105), three diodes (106, 107, and 108), a diode-OR circuit 109, three current detectors (111, 112, and 113), a rectifier circuit 10A, and an overcurrent monitoring circuit 120.

The overcurrent monitoring circuit 120 includes, for example, three amplifiers (121, 122, and 123), a diode-OR circuit 124, a voltage follower circuit 125, a delay circuit 126, and a comparator 127.

Figure 4:
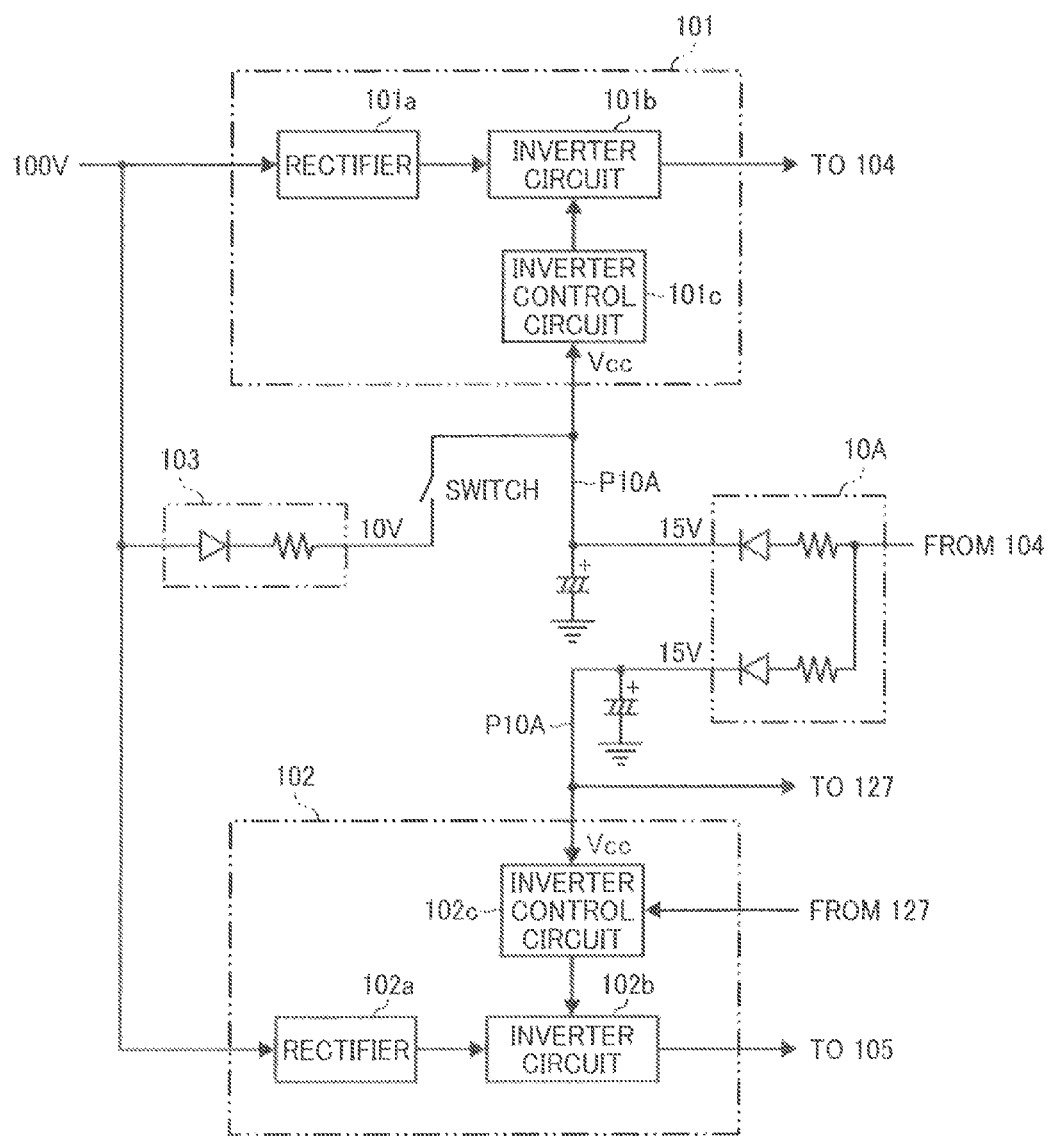
FIG. 4 is a schematic for explaining inverters and a transformer circuit.

The inverter 101 converts a commercial power of 100 volts supplied from the exterior into an electric power of 130 volts at 0.3 ampere. As illustrated in FIG. 4 as one example, the inverter 101 includes: a rectifier 101a that converts a commercial power of 100 volts supplied from the exterior into direct-current (DC) power; an inverter circuit 101b that converts the DC power from the rectifier 101a into an alternating-current (AC) power of 130 volts at 0.3 ampere; and an inverter control circuit 101c that controls the inverter circuit 101b.

The inverter 102 converts a commercial power of 100 volts supplied from the exterior into an electric power of 130 volts at 7 amperes. As illustrated in FIG. 4 as one example, the inverter 102 includes: a rectifier 102a that converts a commercial power of 100 volts supplied from the exterior into DC power; an inverter circuit 102b that converts the DC power from the rectifier 102a into an AC power of 130 volts at 7 amperes; and an inverter control circuit 102c that controls the inverter circuit 102b.

As illustrated in FIG. 4 as one example, the transformer circuit 103 includes a diode and a resistance and converts a commercial power of 100 volts supplied from the exterior into a DC power of 10 volts. Thus converted DC power of 10 volts is output to the inverter 101 as power for driving the inverter control circuit 101c. A switch for connecting and disconnecting the circuits is provided between the transformer circuit 103 and the inverter control circuit 101c.

The rectifier circuit 10A includes two rectifying units each including a resistance and a diode. While one of the rectifying units supplies electric power to the inverter control circuit 101c, the other of the rectifying units supplies electric power to the inverter control circuit 102c. The electric power supplied from the rectifier circuit 10A to each inverter control circuit is indicated with P10A.

Figure 5:
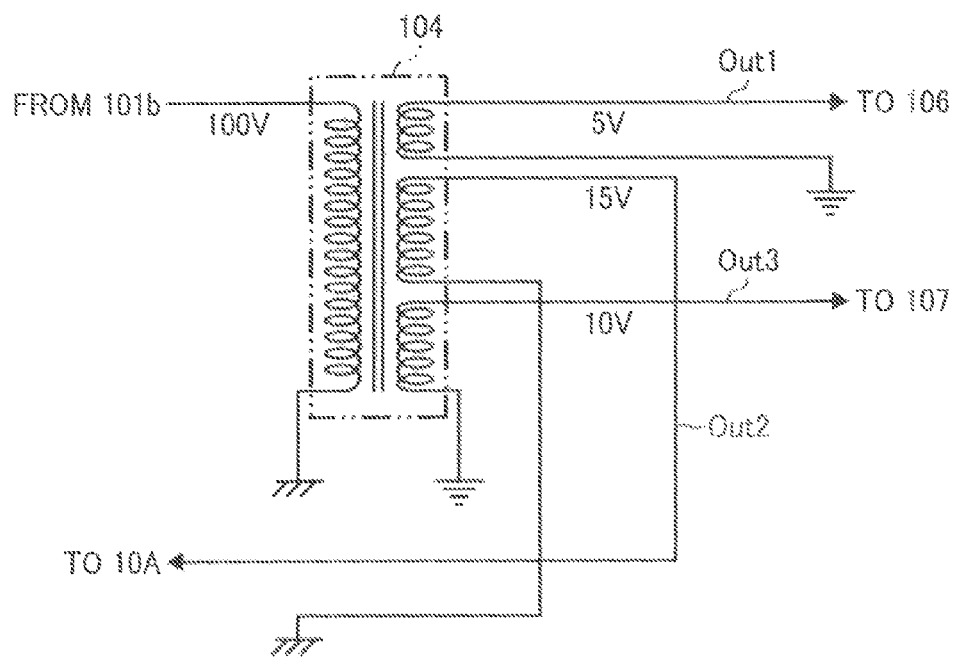
FIG. 5 is a schematic for explaining a transformer 104.

As illustrated in FIG. 5 as one example, the transformer 104 generates an AC power of 5 volts (Out1), an AC power of 15 volts (Out2), and an AC power of 10 volts (Out3) from an AC power of 130 volts output from the inverter 101.

The diode 106 rectifies Out1. The electric power rectified by the diode 106 is supplied to the printer control device 1060 and the scanning control device as power for driving them.

Out2 is output to the inverter 101 and the inverter 102 through the rectifier circuit 10A as electric power for driving the inverter control circuit 101c and the inverter control circuit 102c.

The diode 107 rectifies Out3. The electric power rectified by the diode 107 is one of inputs of the diode-OR circuit 109.

Figure 6:
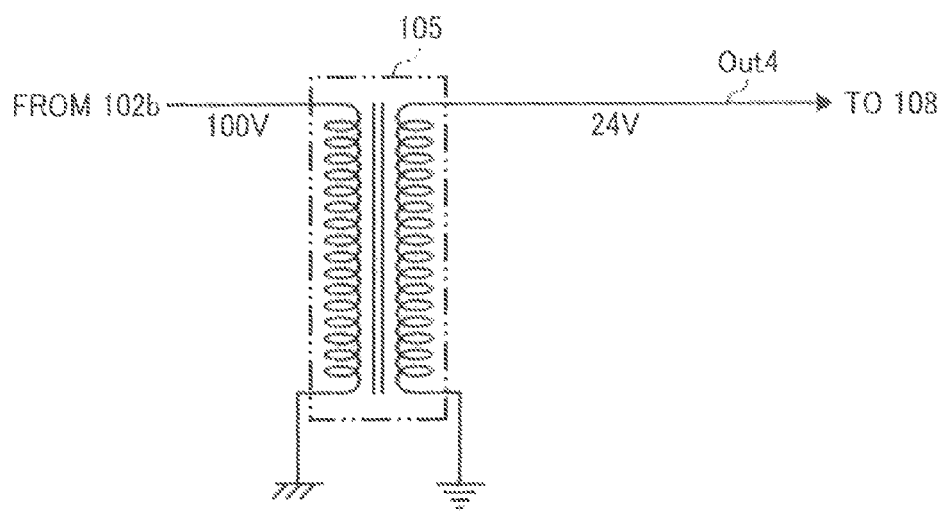
FIG. 6 is a schematic for explaining a transformer 105.

As illustrated in FIG. 6 as one example, the transformer 105 generates an AC power of 24 volts (Out4) from an AC power of 130 volts output from the inverter 102. The diode 108 rectifies Out4.

Figure 7:
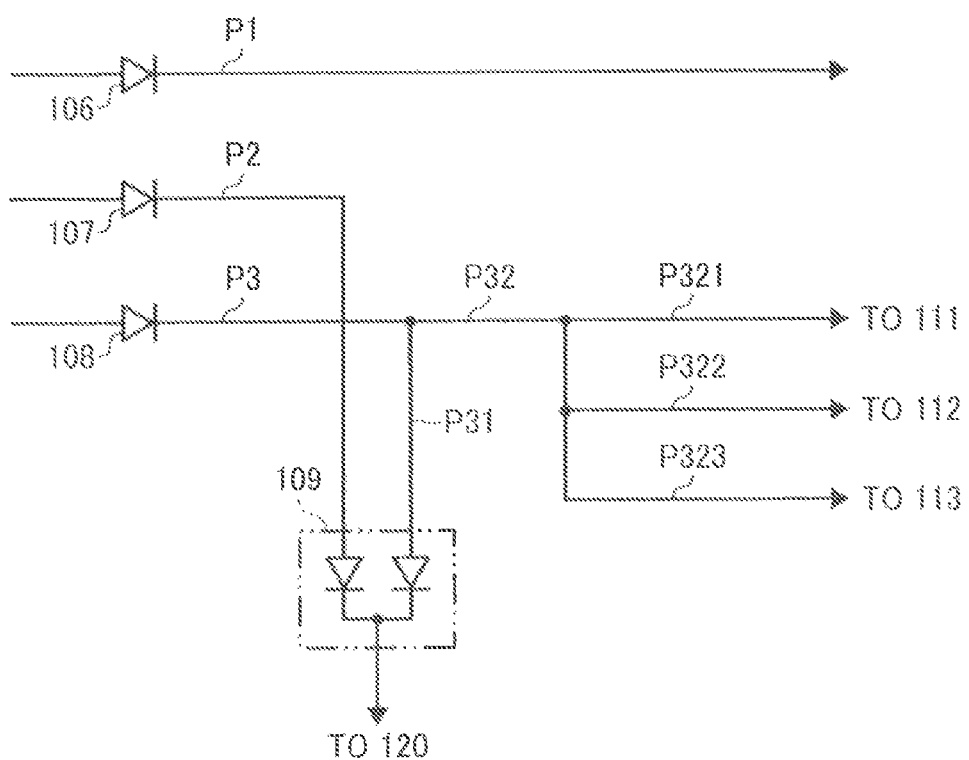
FIG. 7 is a schematic for explaining electric powers P1, P2, and P3.

As illustrated in FIG. 7, the output of the diode 106 is designated as an electric power P1, the output of the diode 107 is designated as an electric power P2, and the output of the diode 108 is designated as an electric power P3, hereinafter for convenience.

The electric power P3 is divided into two (an electric power P31 and an electric power P32), and the electric power P32 is further divided into three (an electric power P321, an electric power P322, and an electric power P323).

The electric power P31 is the other of the inputs of the diode-OR circuit 109.

Referring back to FIG. 3, the electric power P2 and the electric power P31 are input to the diode-OR circuit 109, and the diode-OR circuit 109 outputs the electric power with the higher voltage. The electric power output from the diode-OR circuit 109 is the electric power for driving the overcurrent monitoring circuit 120.

The electric power 321 is supplied to the driving motor for the photosensitive element 1030, the electric power 322 is supplied to the driving motor for the conveying system, and the electric power 323 is supplied to the driving motor for the polygon mirror 13.

The unit including the inverter 101, the transformer 104, and the diode 106 is also referred to as a "first electric power-generating unit", and the unit including the inverter 102, the transformer 105, and the diode 108 is also referred to as a "second electric power-generating unit", hereinafter.

The current detector 111 detects the current of the electric power 321. The current detector 112 detects the current of the electric power 322. The current detector 113 detects the current of the electric power 323.

Figure 8:
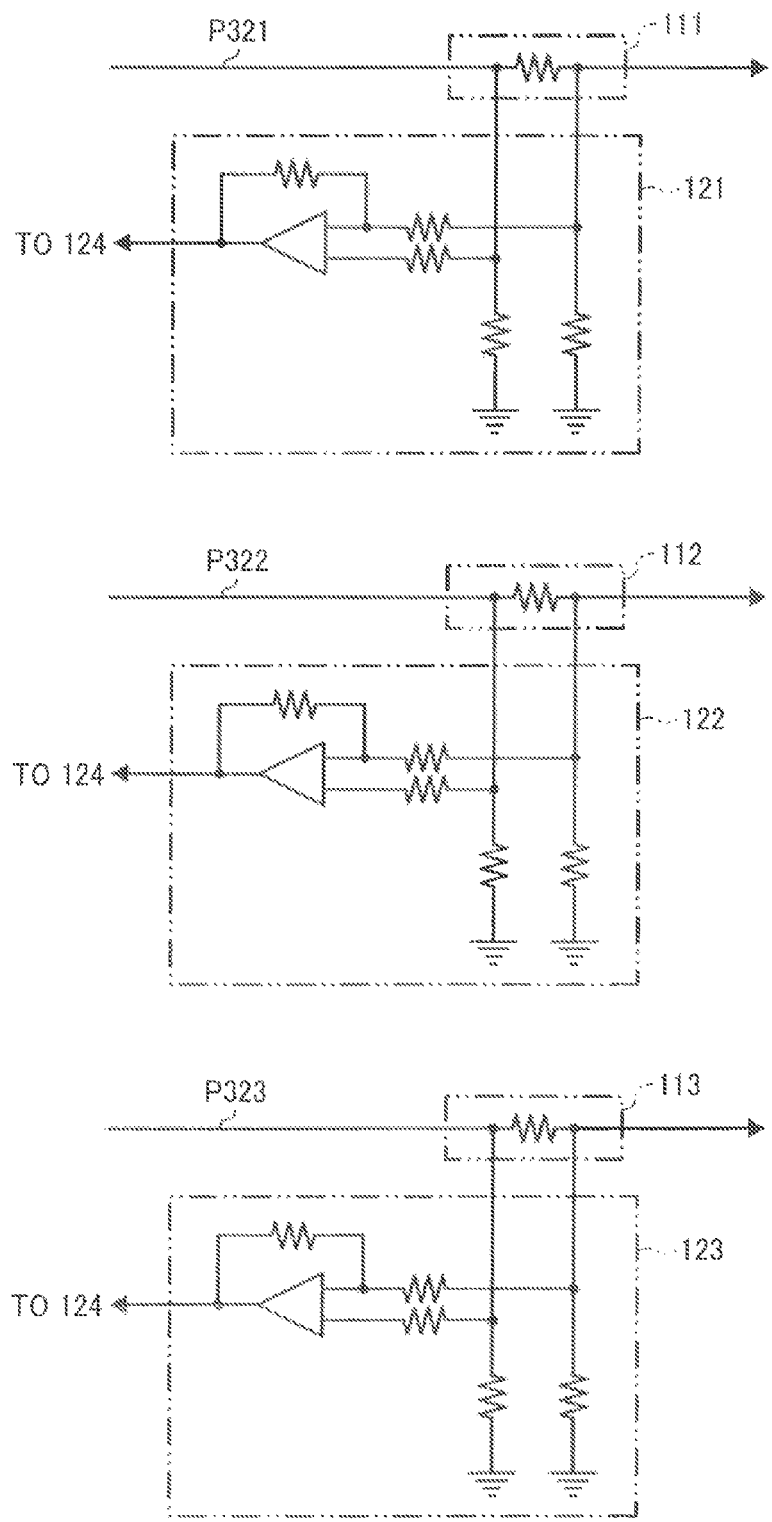
FIG. 8 is a schematic for explaining current detectors and amplifiers.

As illustrated in FIG. 8 as one example, each current detector includes a resistance and converts current information into voltage information. In this embodiment, a current of 20 amperes is set so as to be converted into a voltage of 0.1 volt. A current of equal to or more than 20 amperes is regarded as overcurrent. The so-called hall current sensor may also be used as each current detector.

The amplifier 121 amplifies the voltage output from the current detector 111. The amplifier 122 amplifies the voltage output from the current detector 112. The amplifier 123 amplifies the voltage output from the current detector 113.

As illustrated in FIG. 8 as one example, each amplifier includes an operational amplifier and a plurality of resistances. In each amplifier, the output is zero until the input voltage reaches about 0.08 volt, and when the input voltage exceeds 0.08 volt, the voltage is amplified. In this embodiment, the voltage is set so that 0.1 volt is amplified to 6 volts.

The diode-OR circuit 124 receives output signals from the amplifiers and outputs the signal with the highest voltage among them.

Figure 9:
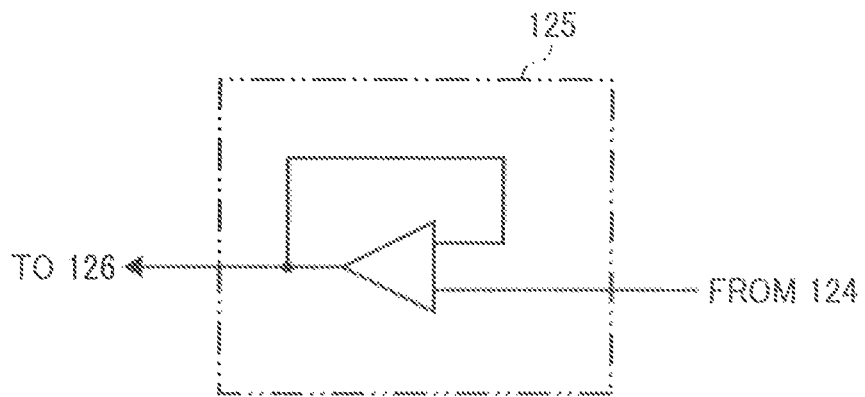
FIG. 9 is a schematic for explaining a voltage follower circuit.

As illustrated in FIG. 9 as one example, the voltage follower circuit 125 includes an operational amplifier and receives the output signal from the diode-OR circuit 124. The voltage follower circuit 125 absorbs the difference among output impedances of the amplifiers.

Figure 10:
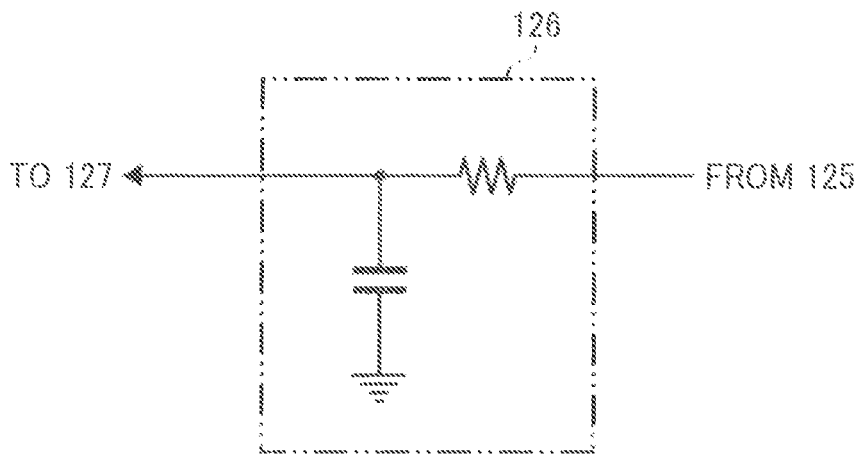
FIG. 10 is a schematic for explaining a delay circuit.

As illustrated in FIG. 10 as one example, the delay circuit 126 includes a capacitor and a resistance and delays the output signal from the voltage follower circuit 125 for a predetermined time (100 milliseconds in this embodiment). The delay time preferably falls within a range of 50 milliseconds to 200 milliseconds.

The charge accumulated in the capacitor of the delay circuit 126 is discharged by the voltage follower circuit 125 when the output of the diode-OR circuit 124 is 0 volt. A delay circuit utilizing a timer integrated circuit (IC) may also be used as the delay circuit 126.

Figure 11:
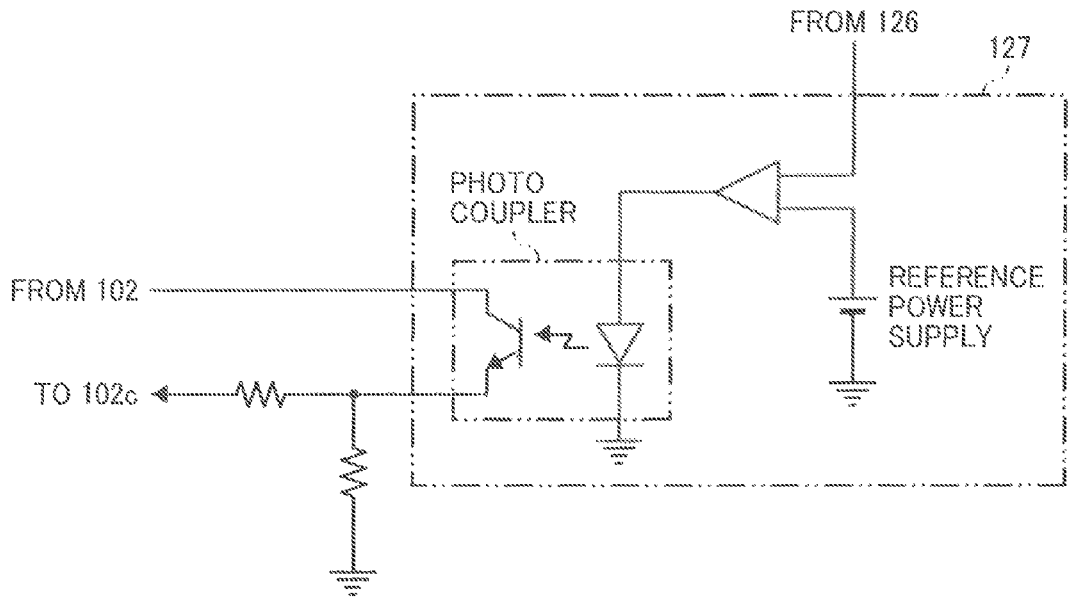
FIG. 11 is a schematic for explaining a comparator.

As illustrated in FIG. 11 as one example, the comparator 127 compares the output voltage of the delay circuit 126 and a reference voltage (6 volts in this embodiment) and outputs the comparison result to the inverter control circuit 102c. In this process, the comparator 127 outputs a "low level" signal when the output voltage of the delay circuit 126 is equal to or less than the reference voltage and outputs a "high level" signal when the output voltage of the delay circuit 126 exceeds the reference voltage.

The output of the comparator 127 is connected to the primary side of the transformer 105, and therefore, the comparator 127 outputs a signal to the inverter control circuit 102c through a photo coupler for the purpose of insulation.

Figure 12:
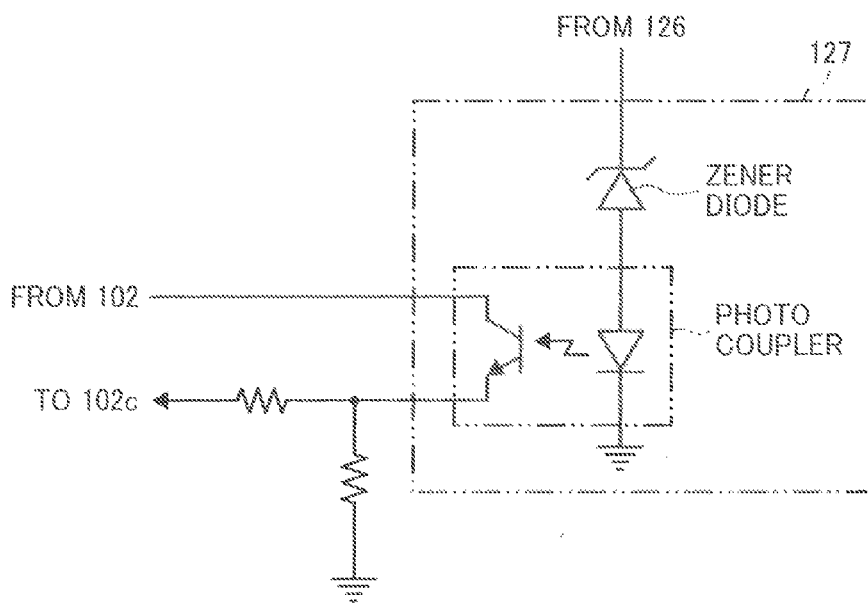
FIG. 12 is a schematic for explaining a first modified embodiment of the comparator.

As illustrated in FIG. 12 as one example, the comparator 127 may be a comparator utilizing a Zener diode.

When the signal from the comparator 127 changes from the "low level" to the "high level", the inverter control circuit 102c stops the output of the inverter circuit 102b.

Figure 13:
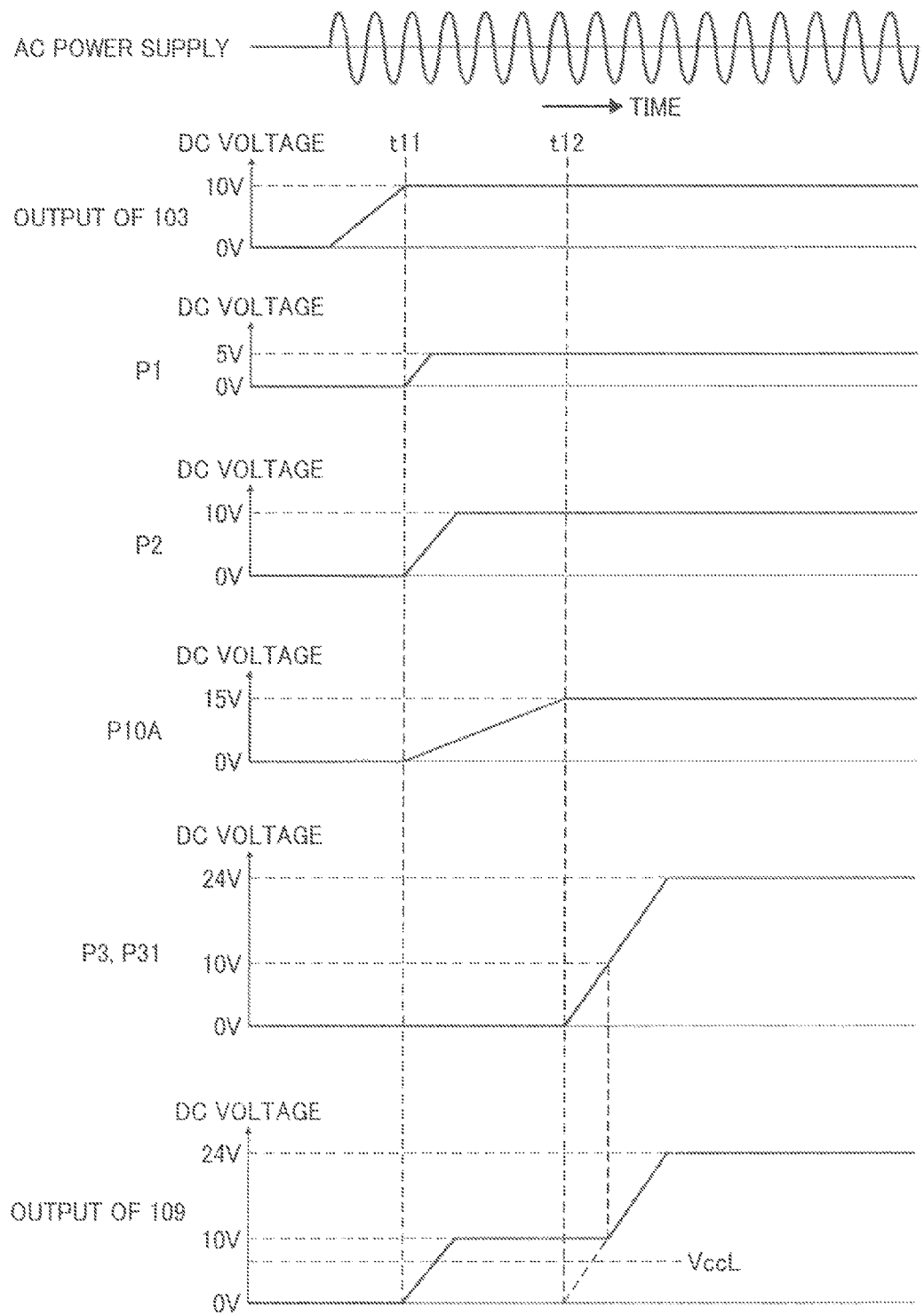
FIG. 13 is a timing chart (1) for explaining the operation of the power supply apparatus.

FIG. 13 illustrates a timing chart in a state where the AC power switch of the laser printer 1000 is turned to an on position, and a commercial power of 100 volts is supplied to the power supply apparatus 100. The switch between the transformer circuit 103 and the inverter control circuit 101c is in a connected state.

When the output voltage of the transformer circuit 103 reaches 10 volts (at a time t11), the inverter control circuit 101c starts working to initiate the operation of the inverter 101.

The inverter 101 outputs an AC power of 130 volts to gradually increase the voltage of the electric power P1 to 5 volts and increase the voltage of the electric power P2 to 10 volts.

According to the increase, the output voltage of the diode-OR circuit 109 gradually increases to 10 volts.

When the output voltage of the diode-OR circuit 109 reaches equal to or more than a minimum operating voltage VccL (3 volts in this embodiment) of the overcurrent monitoring circuit 120, the overcurrent monitoring circuit 120 starts to operate.

When the voltage of P10A reaches 15 volts (at a time t12), the inverter control circuit 102c starts working to initiate the operation of the inverter 102. P10A is also supplied to the inverter control circuit 101c. When the voltage of P10A reaches 15 volts, the switch between the transformer circuit 103 and the inverter control circuit 101c is made to be in a disconnected state. This can reduce energy-loss at the transformer circuit 103.

The inverter 102 outputs an AC power of 130 volts to gradually increase the voltage of the electric power P3.

When the voltage of the electric power P3 exceeds 10 volts, according to the increase, the output voltage of the diode-OR circuit 109 also increases.

When the voltage of the electric power P3 reaches 24 volts, the output voltage of the diode-OR circuit 109 reaches 24 volts.

Figure 14:
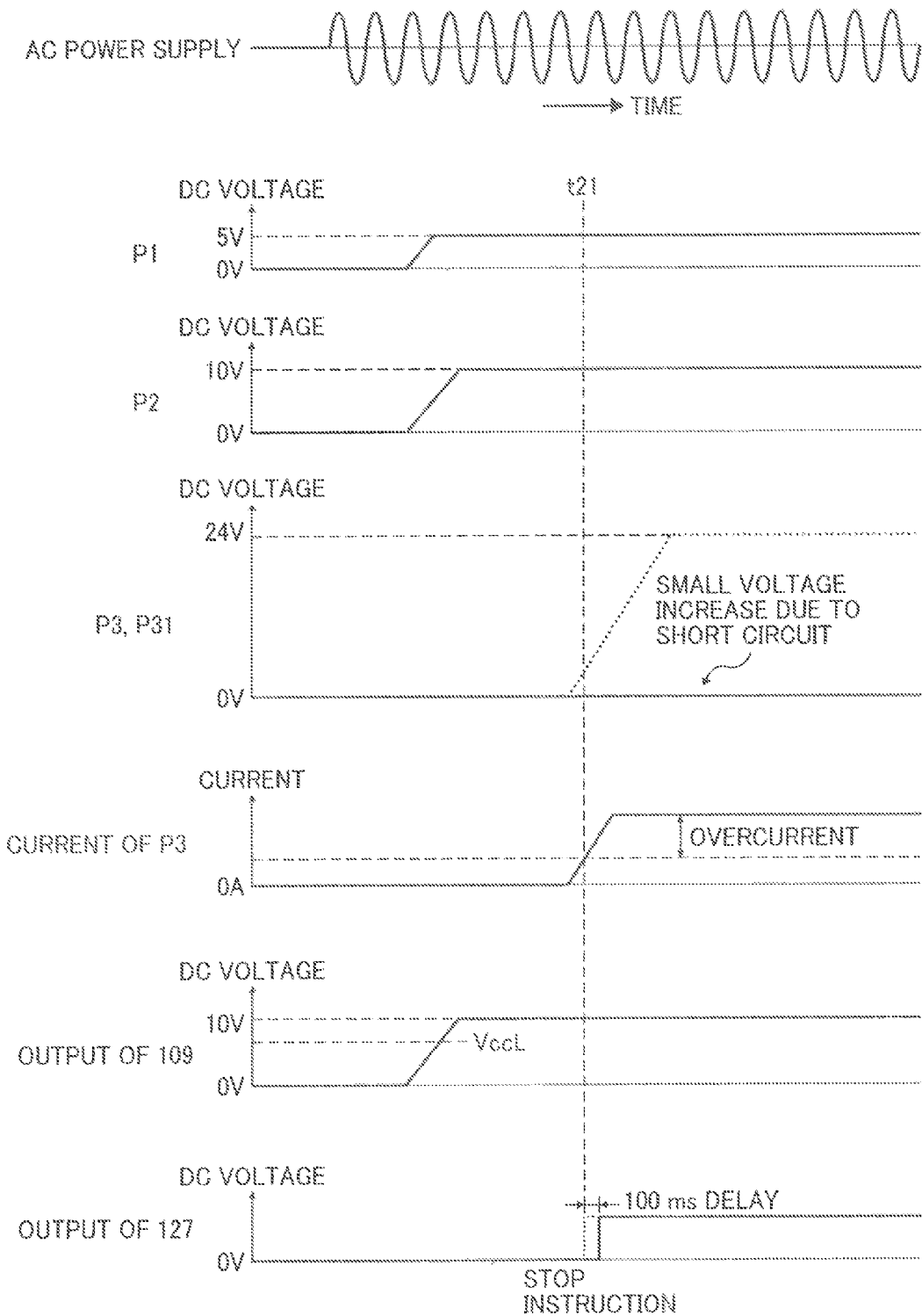
FIG. 14 is a timing chart (2) for explaining the operation of the power supply apparatus.

FIG. 14 illustrates the operation of the power supply apparatus 100 in which a short circuit occurs at a load to which an electric power of 24 volts is supplied.

Even when the inverter 102 outputs an AC power of 130 volts in this state, the voltage of the electric power P3 does not increase much but the current of the electric power P3 increases. When the current of the electric power P3 exceeds the reference value (at a time t21), the output of the comparator 127 changes from the "low level" to the "high level" after 100 milliseconds, and the output of the inverter circuit 102b is immediately stopped.

Figure 15:
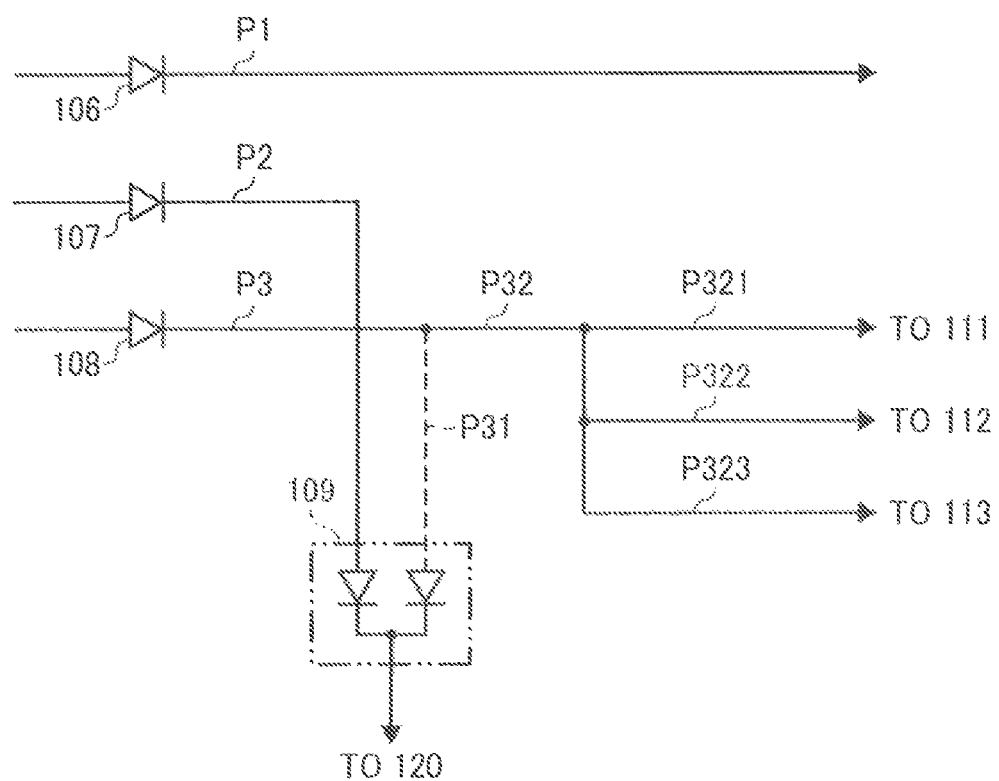
FIG. 15 is a schematic for explaining the case where an electric power P31 is not input to a diode-OR circuit 109.
Figure 16:
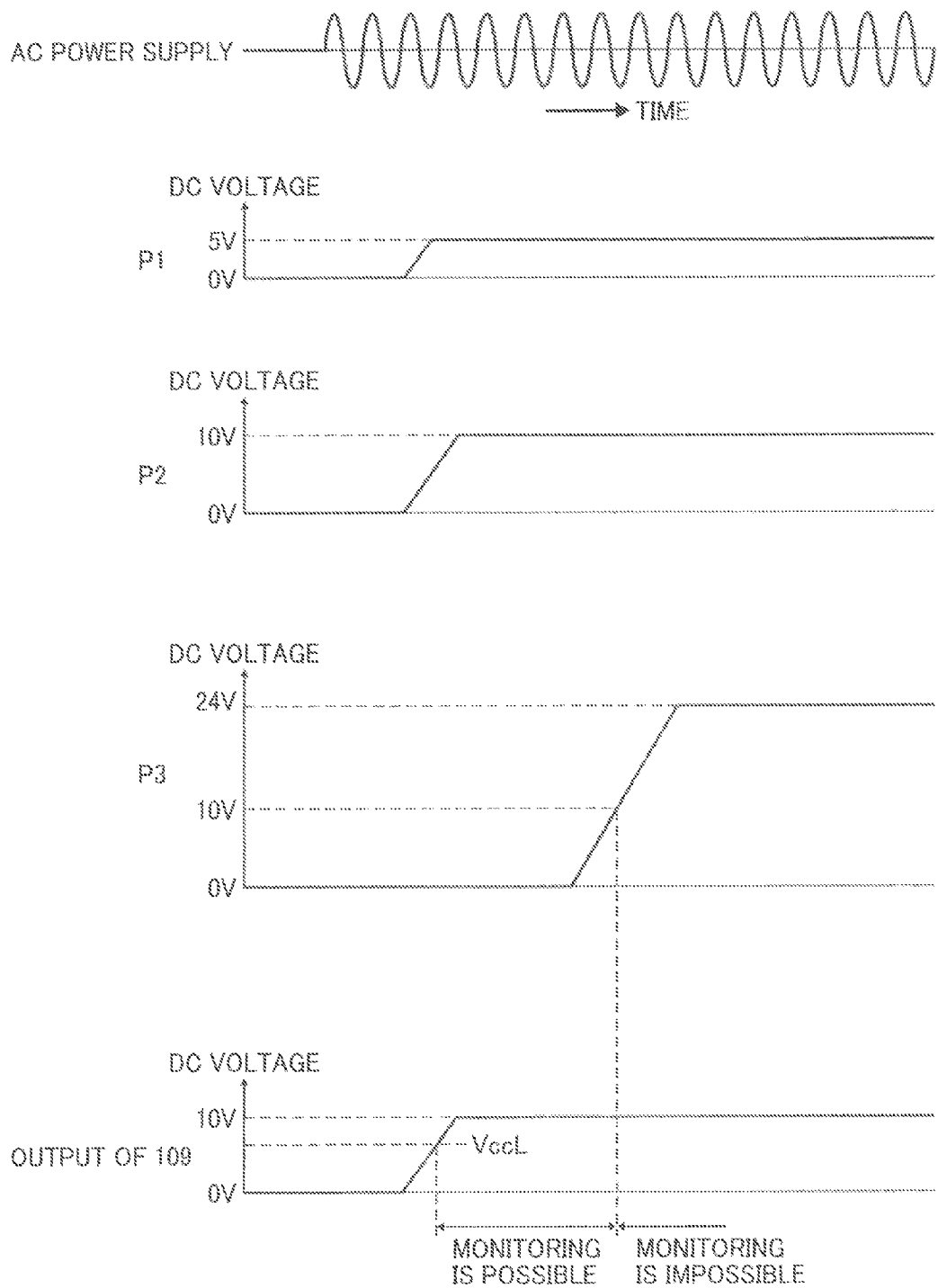
FIG. 16 is a timing chart in the case of FIG. 15.

FIG. 16 is a timing chart in the case where the electric power P31 is not input to the diode-OR circuit 109 as illustrated in FIG. 15.

In this case, although the overcurrent monitoring circuit 120 can monitor overcurrent from when the inverter control circuit 101c starts working till when the voltage of the electric power P3 exceeds 10 volts, the overcurrent monitoring circuit 120 cannot normally monitor overcurrent after the voltage of the electric power P3 exceeds 10 volts.

Figure 17:
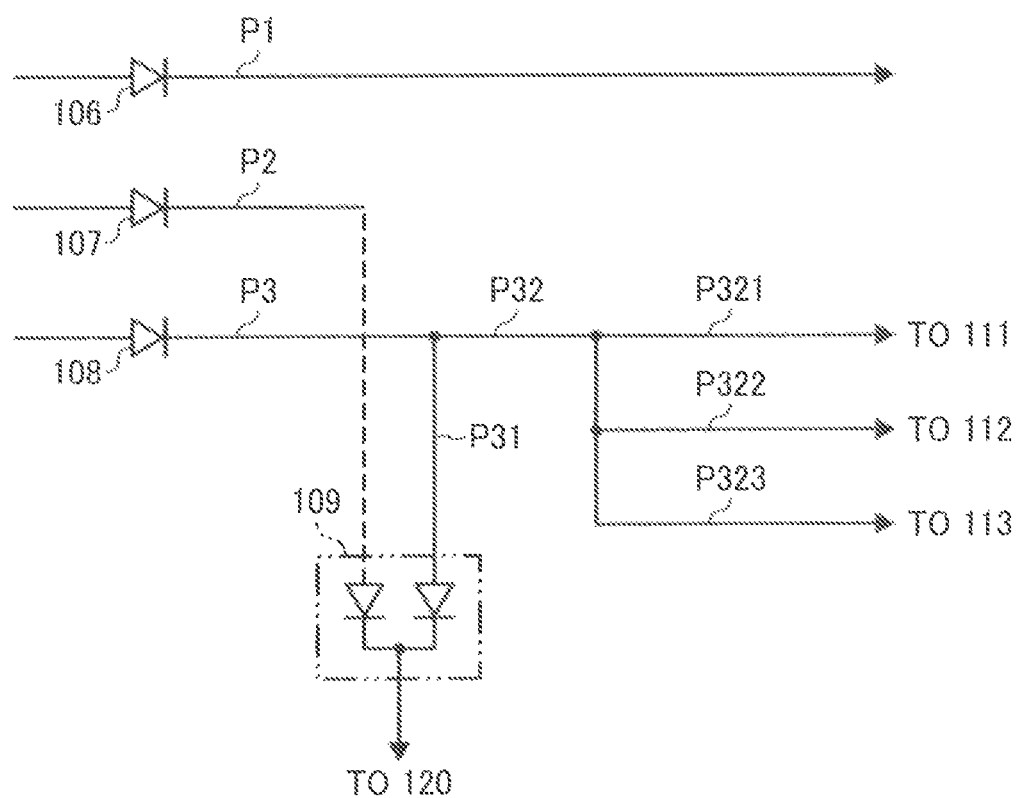
FIG. 17 is a schematic for explaining the case where the electric power P2 is not input to the diode-OR circuit 109.
Figure 18:
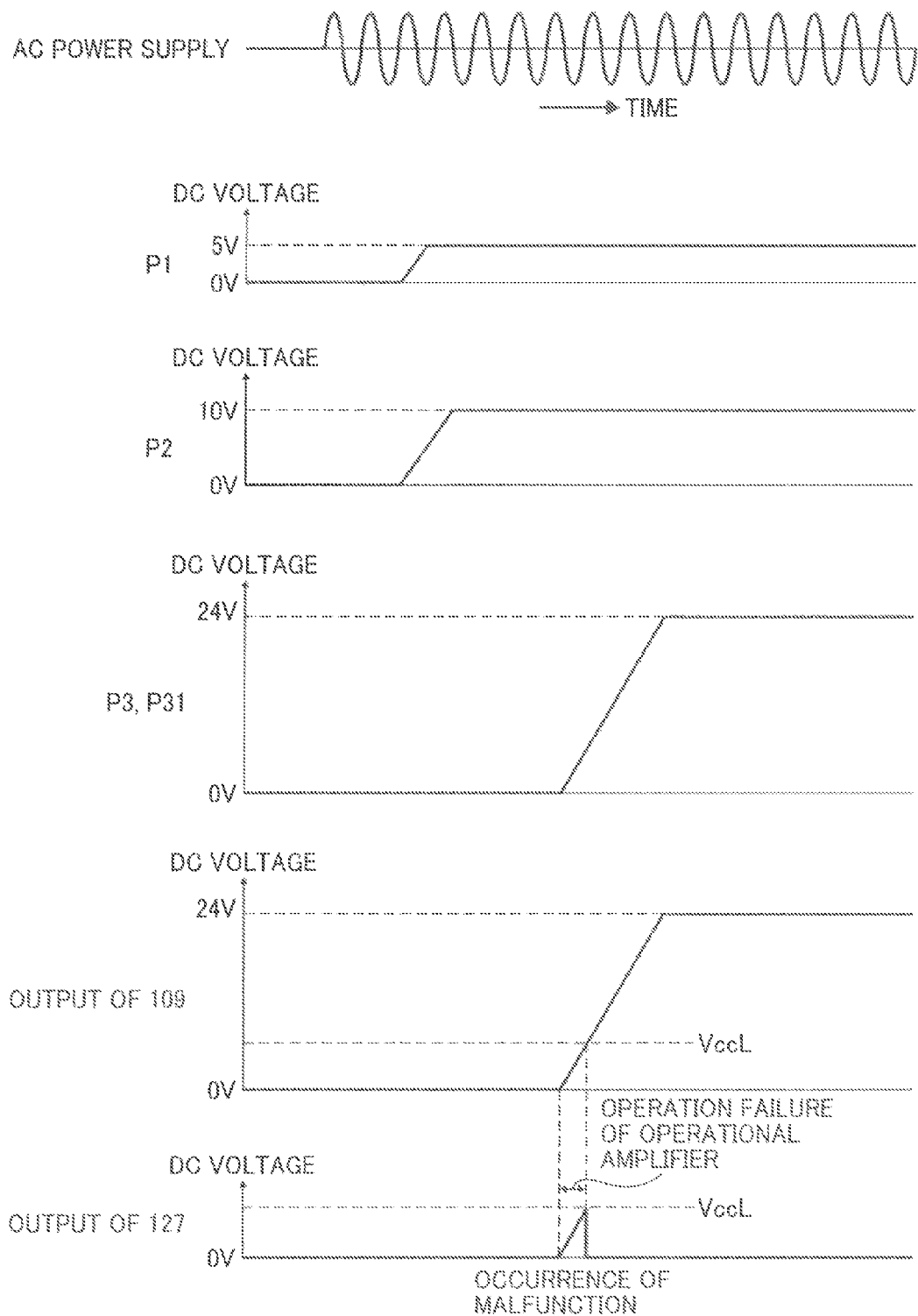
FIG. 18 is a timing chart (1) in the case of FIG. 17.

FIG. 18 is a timing chart in the case where the electric power P2 is not input to the diode-OR circuit 109 as illustrated in FIG. 17.

In this case, in the overcurrent monitoring circuit 120, the voltage supplied for driving the operational amplifiers of the amplifiers is output from the operational amplifiers until the output voltage of the diode-OR circuit 109 reaches the minimum operating voltage of the overcurrent monitoring circuit 120. As a result, even when overcurrent does not flow, the overcurrent monitoring circuit 120 operates as though detecting overcurrent.

Figure 19:
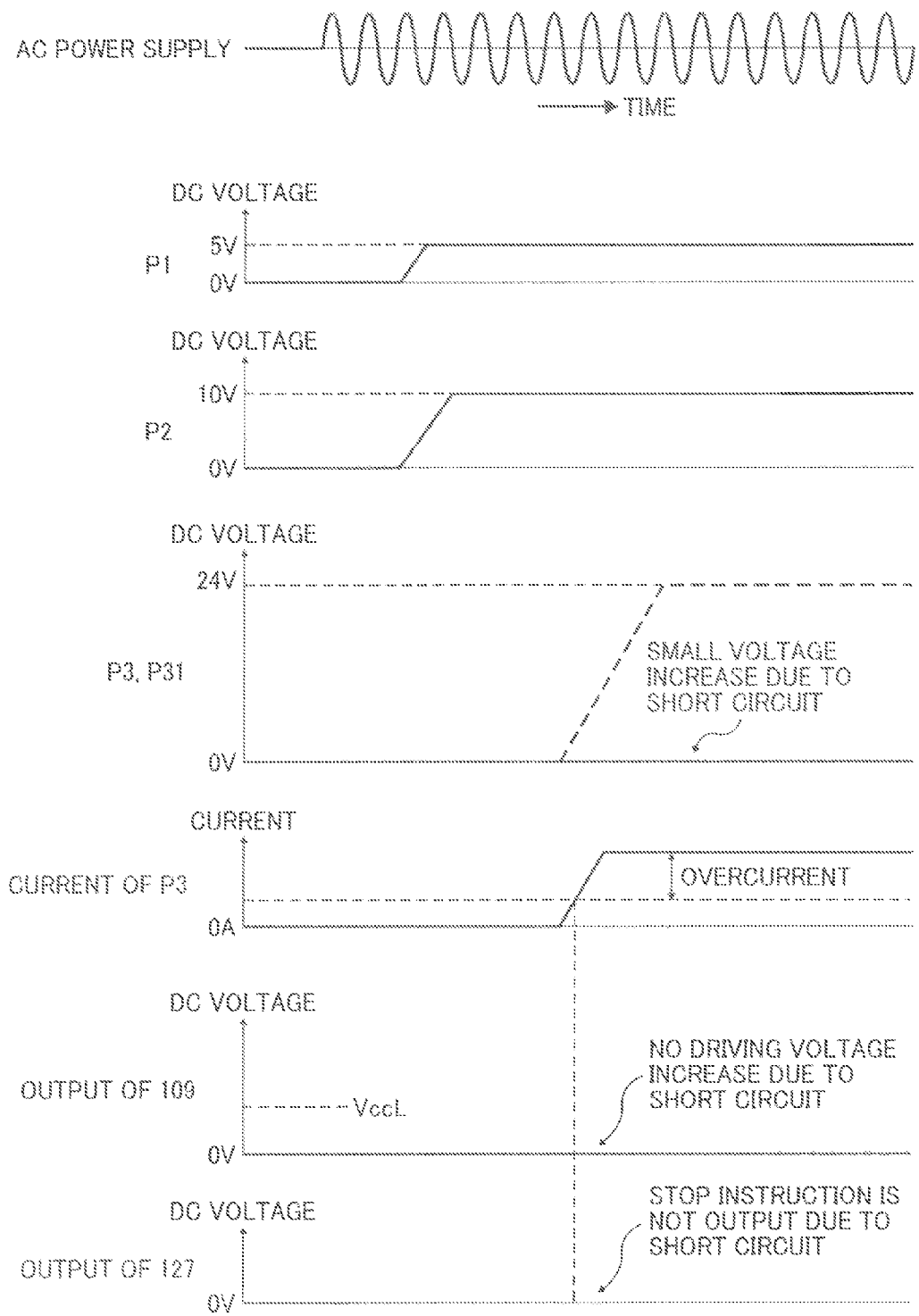
FIG. 19 is a timing chart (2) in the case of FIG. 17.

FIG. 19 is a timing chart in the case where a short circuit occurs at a load to which an electric power of 24 volts is supplied in the case of FIG. 17. In this case, even when overcurrent flows, the overcurrent monitoring circuit 120 does not operate because the output voltage of the diode-OR circuit 109 is low, and the output of the inverter circuit 102b is not stopped.

In the present embodiment, the electric power P2 and the electric power P31 are input to the diode-OR circuit 109, and therefore, overcurrent can be normally monitored.

As is apparent from the description, the laser printer 1000 in the present embodiment includes the power supply apparatus 100 as the power supply apparatus of the present invention.

The first electric power-generating unit is structured as the first electric power-generating circuit, and the second electric power-generating unit is structured as the second electric power-generating circuit.

The overcurrent monitoring circuit 120 is structured as the overcurrent monitoring circuit of the power supply apparatus of the present invention.

Five volts corresponds to the first voltage, and 24 volts corresponds to the second voltage.

As described above, the power supply apparatus 100 according to the present embodiment includes: the first electric power-generating unit that generates an electric power with a voltage of 5 volts; the second electric power-generating unit that generates an electric power with a voltage of 24 volts; and the overcurrent monitoring circuit 120 to which electric powers for operation are supplied from the first electric power-generating unit and the second electric power-generating unit and that monitors overcurrent in the second electric power-generating unit.

The first electric power-generating unit starts working prior to the second electric power-generating unit. The overcurrent monitoring circuit 120 is operated with an electric power supplied from the first electric power-generating unit after the start of the first electric power-generating unit and before the start of the second electric power-generating unit.

After the start of the second electric power-generating unit, the overcurrent monitoring circuit 120 is operated with an electric power supplied from the second electric power-generating unit.

The overcurrent monitoring circuit 120 includes: the three current detectors (111, 112, and 113) that individually detect currents flowing from the second electric power-generating unit into three loads; the three amplifiers (121, 122, and 123) that individually amplify signals output from the three current detectors; the diode-OR circuit 124 that outputs the signal with the highest voltage among the outputs of the three amplifiers; the voltage follower circuit 125 that subjects the output signal of the diode-OR circuit 124 to impedance transformation; the delay circuit 126 that delays the output of the voltage follower circuit 125; and the comparator 127 that outputs a stop signal for stopping electric power generation to the second electric power-generating unit when the output voltage of the delay circuit 126 exceeds the predetermined value.

With this structure, there is no need to separately provide an additional special power supply for operating the overcurrent monitoring circuit 120. Therefore, this structure enables downsizing and cost reduction.

Accordingly, the laser printer 1000 according to the present embodiment includes the power supply apparatus 100 and, as a result, allows downsizing and cost reduction.

Figure 20:
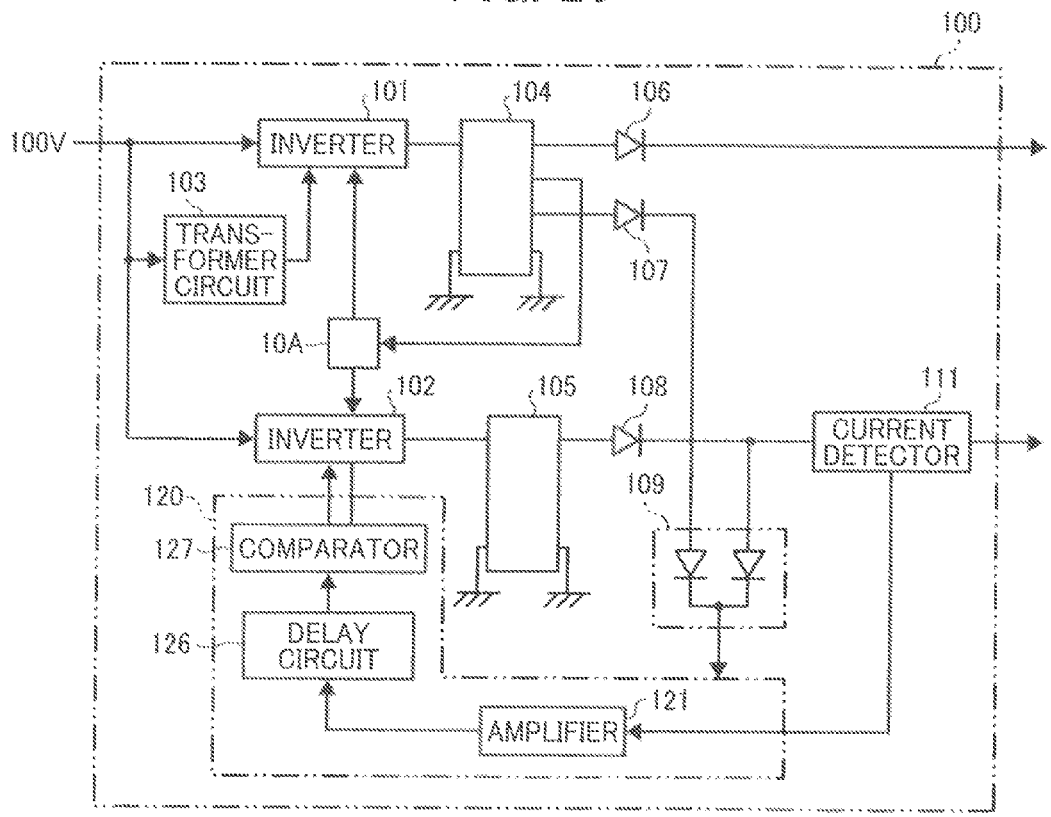
FIG. 20 is a schematic for explaining a modified embodiment of the power supply apparatus.

The case where three 24-volt electric powers are supplied is described in the embodiment described above, but it is not limited thereto. For example, as illustrated in FIG. 20, one 24-volt electric power may also be supplied.

Figure 21:
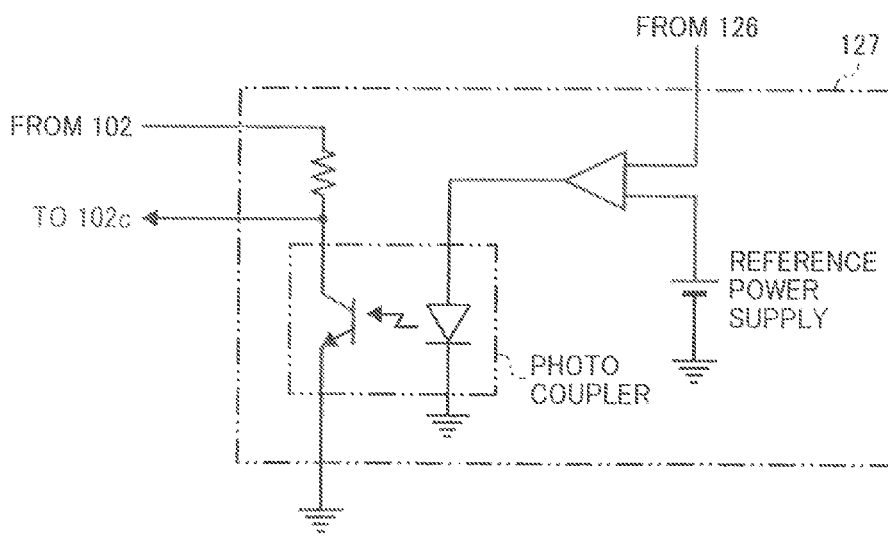
FIG. 21 is a schematic for explaining a second modified embodiment of the comparator.

The case where the output of the comparator 127 changes from the "low level" to the "high level" when overcurrent is detected is described in the embodiment described above, but it is not limited thereto. As illustrated in FIG. 21 as one example, the output of the comparator 127 may also change from the "high level" to the "low level" when overcurrent is detected.

The case where the first voltage is 5 volts and the second voltage is 24 volts is described in the embodiment described above, but it is not limited thereto. In other words, all that is required is that the second voltage is higher than the first voltage.

The case where the power supply apparatus supplies electric powers with two types of voltages is described in the embodiment described above, but it is not limited thereto. In other words, all that is required is that the power supply apparatus supplies a plurality of electric powers with different voltages.

The case where the image forming apparatus is the laser printer 1000 is described in the embodiment described above, but it is not limited thereto.

For example, the image forming apparatus may also be an image forming apparatus that directly radiates laser light onto a medium (such as paper) coloring by the laser light.

The image forming apparatus may also be an image forming apparatus in which a silver-salt film is used as an image carrier. In this case, a latent image can be formed on the silver-salt film by optical scanning and be visualized by a process same as a development process in a common silver halide photography process. The image can be transferred onto photographic paper by a process same as a printing process in a common silver halide photography process. Such an image forming apparatus can serve as an optical plate-making device or an optical drawing device for drawing computed tomographic (CT) scan images or the like.

Figure 22:
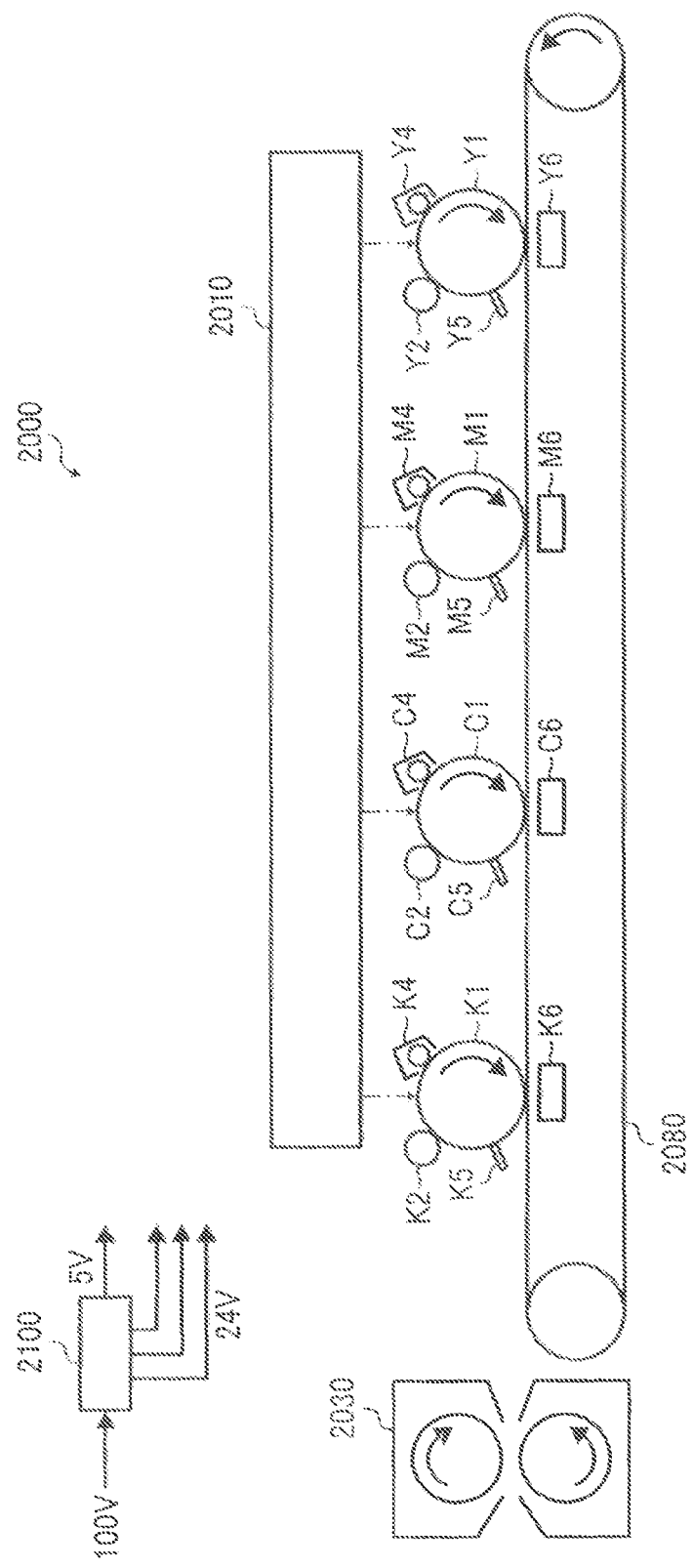
FIG. 22 is a schematic for explaining a structure of a color printer.

For example, as illustrated in FIG. 22, the image forming apparatus may also be a color printer 2000 including a plurality of photosensitive elements.

The color printer 2000 is a tandem multiple color printer that forms images in full color by superimposing four colors (black, cyan, magenta, and yellow). The color printer 2000 includes: for example, "a photosensitive element K1, a charging unit K2, a developing unit K4, a cleaning unit K5, and a transfer unit K6" for black; "a photosensitive element C1, a charging unit C2, a developing unit C4, a cleaning unit C5, and a transfer unit C6" for cyan; "a photosensitive element M1, a charging unit M2, a developing unit M4, a cleaning unit M5, and a transfer unit M6" for magenta; "a photosensitive element Y1, a charging unit Y2, a developing unit Y4, a cleaning unit Y5, and a transfer unit Y6" for yellow; an optical scanning device 2010; a transfer belt 2080; a fixing unit 2030; and a power supply apparatus 2100.

Each of the photosensitive elements rotates in an arrow direction in FIG. 22. The charging unit, the developing unit, the transfer unit, and the cleaning unit are arranged around each photosensitive element in the rotation direction.

Each of the charging units uniformly charges the surface of the corresponding photosensitive element. The optical scanning device 2010 optically scans the surface of each photosensitive element charged by the charging unit to form a latent image on the each photosensitive element.

The corresponding developing unit forms a toner image on the surface of the each photosensitive element. Subsequently, the corresponding transfer unit sequentially transfers the toner image in each color onto a recording sheet on the transfer belt 2080, and finally, the fixing unit 2030 fixes the image onto the recording sheet.

The power supply apparatus 2100 is a power supply apparatus similar to the power supply apparatus 100. Accordingly, the color printer 2000 can obtain effects similar to those obtained in the laser printer 1000.

The power supply apparatus 100 according to the present embodiment is applicable to apparatuses other than image forming apparatuses. For example, the power supply apparatus 100 may also be used for household electrical appliances, such as electric refrigerators, electric washing machines, and electric vacuum cleaners. Thus, the power supply apparatus 100 according to the present embodiment is also applicable to an electrical equipment that requires a plurality of electric powers with different voltages.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply apparatus that supplies a plurality of electric powers with different voltages, the power supply apparatus comprising:
    a first electric power-generating circuit that generates an electric power with a first voltage;
    a second electric power-generating circuit that generates an electric power with a second voltage that is higher than the first voltage; and
    an overcurrent monitoring circuit to which electric powers for operation are supplied from the first electric power-generating circuit and the second electric power-generating circuit and that monitors overcurrent in the second electric power-generating circuit, wherein the overcurrent monitoring circuit comprises:

a current detecting unit that detects a current flowing from the second electric power-generating circuit into a load when the electric power with the second voltage is supplied to the load; and a comparing unit that outputs a stop signal for stopping generation of the electric power with the second voltage to the second electric power-generating circuit, when a level of a signal corresponding to the current which has been detected exceeds a predetermined value.

2. The power supply apparatus according to claim 1, wherein the first electric power-generating circuit starts working prior to the second electric power-generating circuit, and the overcurrent monitoring circuit is operated with an electric power supplied from the first electric power-generating circuit after start of the first electric power-generating circuit and before start of the second electric power-generating circuit.

3. The power supply apparatus according to claim 2, wherein the overcurrent monitoring circuit is operated with an electric power supplied from the second electric power-generating circuit after start of the second electric power-generating circuit.

4. The power supply apparatus according to claim 1, wherein the overcurrent monitoring circuit further comprises:

an amplifying unit that amplifies a signal from the current detecting unit, wherein the comparing unit outputs the stop signal for stopping generation of the electric power with the second voltage to the second electric power-generating circuit when a level of the signal amplified by the amplifying unit exceeds a predetermined value.

5. The power supply apparatus according to claim 4, further comprising a delay circuit that is arranged at a position between the amplifying unit and the comparing unit and that delays an output signal from the amplifying unit.

6. The power supply apparatus according to claim 1, wherein the second electric power-generating circuit generates a plurality of electric powers with the second voltage, and the overcurrent monitoring circuit comprises:

a plurality of current detecting units, each of which respectively detects currents flowing from the second electric power-generating circuit into each of a plurality of loads when the electric powers with the second voltage are supplied to the loads;

a plurality of amplifying units, each of which respectively amplifies each of signals from the current detecting units; and a comparing unit that outputs a stop signal for stopping generation of the electric powers with the second voltage to the second electric power-generating circuit when a level of at least one of the signals amplified by the amplifying units exceeds a predetermined value.

7. The power supply apparatus according to claim 6, further comprising an OR circuit that is arranged between the amplifying units and the comparing unit and that outputs a signal with a highest voltage among a plurality of signals output from the amplifying units.

8. The power supply apparatus according to claim 7, wherein the OR circuit is a diode-OR circuit.

9. The power supply apparatus according to claim 7, further comprising an impedance transformation circuit that subjects an output signal of the OR circuit to impedance transformation.

10. The power supply apparatus according to claim 7, further comprising a delay circuit that is arranged between the OR circuit and the comparing unit and that delays a signal.

11. An electrical equipment comprising a power supply apparatus that supplies a plurality of electric powers with different voltages, wherein the power supply apparatus comprising:

a first electric power-generating circuit that generates an electric power with a first voltage;

a second electric power-generating circuit that generates an electric power with a second voltage that is higher than the first voltage; and an overcurrent monitoring circuit to which electric powers for operation are supplied from the first electric power-generating circuit and the second electric power-generating circuit and that monitors overcurrent in the second electric power-generating circuit, wherein the overcurrent monitoring circuit comprises:

a current detecting unit that detects a current flowing from the second electric power-generating circuit into a load when the electric power with the second voltage is supplied to the load; and a comparing unit that outputs a stop signal for stopping generation of the electric power with the second voltage to the second electric power-generating circuit, when a level of a signal corresponding to the current which has been detected exceeds a predetermined value.

12. The electrical equipment according to claim 11, wherein the overcurrent monitoring circuit further comprises:

an amplifying unit that amplifies a signal from the current detecting unit, wherein the comparing unit outputs the stop signal for stopping generation of the electric power with the second voltage to the second electric power-generating circuit when a level of the signal amplified by the amplifying unit exceeds a predetermined value.

13. An image forming apparatus comprising a power supply apparatus that supplies a plurality of electric powers with different voltages, wherein the power supply apparatus comprising:

a first electric power-generating circuit that generates an electric power with a first voltage;

a second electric power-generating circuit that generates an electric power with a second voltage that is higher than the first voltage; and an overcurrent monitoring circuit to which electric powers for operation are supplied from the first electric power-generating circuit and the second electric power-generating circuit and that monitors overcurrent in the second electric power-generating circuit, wherein the overcurrent monitoring circuit comprises:

a current detecting unit that detects a current flowing from the second electric power-generating circuit into a load when the electric power with the second voltage is supplied to the load; and a comparing unit that outputs a stop signal for stopping generation of the electric power with the second voltage to the second electric power-generating circuit, when a level of a signal corresponding to the current which has been detected exceeds a predetermined value.

14. The image forming apparatus according to claim 13, wherein the overcurrent monitoring circuit further comprises:

an amplifying unit that amplifies a signal from the current detecting unit, wherein the comparing unit outputs the stop signal for stopping generation of the electric power with the second voltage to the second electric power-generating circuit when a level of the signal amplified by the amplifying unit exceeds a predetermined value.

* * * * *